US008767030B2

(12) United States Patent
Singhal

(10) Patent No.: US 8,767,030 B2
(45) Date of Patent: Jul. 1, 2014

(54) SYSTEM AND METHOD FOR A GROOMING MIRROR IN A PORTABLE ELECTRONIC DEVICE WITH A USER-FACING CAMERA

(76) Inventor: Tara Chand Singhal, Torrance, CA (US)

( * ) Notice: Subject to any disclaimer, the term of this patent is extended or adjusted under 35 U.S.C. 154(b) by 344 days.

(21) Appl. No.: 13/066,164

(22) Filed: Apr. 7, 2011

(65) Prior Publication Data

US 2012/0257000 A1 Oct. 11, 2012

(51) Int. Cl.
*H04N 7/14* (2006.01)

(52) U.S. Cl.
USPC ........................................ 348/14.01; 455/416

(58) Field of Classification Search
USPC ............................................ 348/14.01–14.08
See application file for complete search history.

(56) References Cited

U.S. PATENT DOCUMENTS

| | | | |
|---|---|---|---|
| 6,335,753 B1 * | 1/2002 | McDonald .................. | 348/14.01 |
| 8,200,075 B1 * | 6/2012 | Lai .................................. | 396/50 |
| 8,345,114 B2 * | 1/2013 | Ciuc et al. ................... | 348/222.1 |
| 8,363,818 B2 * | 1/2013 | Gupta ........................ | 379/266.06 |
| 2006/0202942 A1 * | 9/2006 | Fong .............................. | 345/102 |
| 2006/0268101 A1 * | 11/2006 | He et al. ...................... | 348/14.12 |
| 2007/0040033 A1 * | 2/2007 | Rosenberg ............... | 235/462.36 |
| 2007/0271110 A1 * | 11/2007 | Van Der Linden et al. ....... | 705/1 |
| 2009/0189913 A1 * | 7/2009 | Moody et al. ................. | 345/619 |
| 2012/0081500 A1 * | 4/2012 | Border et al. .............. | 348/14.02 |

* cited by examiner

*Primary Examiner* — Maria El-Zoobi
(74) *Attorney, Agent, or Firm* — Steve Roeder, Esq.

(57) ABSTRACT

A system for a grooming mirror in a portable electronic device with a user-facing CCD camera has a makeup function that when activated activates the user-facing camera on the device, the camera captures images of a user's face and displays live images of the user face on the screen, wherein, the device functions as a grooming mirror for the user. The makeup function operates on the captured images to crop and digitally focus the images to show close up images of the user face, thus the device functions as a mirror for the face for grooming and applying cosmetics. The device has a feature to put on hold a face to face communication function, while the user uses the makeup function for grooming and to apply cosmetics. The device is equipped with a user-facing light that is activated to light up the face for the camera.

19 Claims, 7 Drawing Sheets

At step 100, operating a make up function logic in a portable electronic device that has a display screen, a storage memory, a CPU, and a user facing camera;

At step 102, activating the makeup function activates the user facing camera on the device that is looking at a user's face and displaying the face image on the screen, thereby, the device functions as a make up mirror for the purpose of seeing the face on the screen.

At step 104, operating on the images, by the make up function, to crop and adjust the images in size to fill the screen that show a close up image of the user face, enabling the device to function as a make up mirror for the purpose of seeing the face and applying cosmetics on the face.

At step 106, providing user controls on the device by the make up function that enable one of the close up images of, an entire face, forehead, eyes, cheeks, nose and lips and chins or a combination of any of them to be displayed on the screen, thereby a close up viewing of these parts of the facial image is displayed on the screen for the purpose of applying cosmetics to these parts of the face.

Figure 5

SYSTEM AND METHOD FOR A GROOMING MIRROR IN A PORTABLE ELECTRONIC DEVICE WITH A USER-FACING CAMERA

CROSS REFERENCE

None

FIELD OF THE INVENTION

A system for a grooming mirror in a portable electronic device with a user-facing CCD camera has a makeup function. The makeup function captures live images of a user's face, digitally focuses, and displays these live images on the screen and the device functions as a grooming mirror for the user.

BACKGROUND

Portable wireless communication devices, also known as smart phones, in various form factors have become indispensable for the masses for the many features they provide. Increasingly more features have been added such as multiple cameras and the ability to receive and view videos.

It is the objective of the embodiments herein to make such portable electronic devices even more useful to the masses by providing additional and new features in such devices.

SUMMARY

A large segment of the population is made up of women. Almost all of them carry makeup items in their purse or hand bag. These may include any number of items to include at least a small mirror, lipstick and freshening powder.

It is believed, due to societal influences and or their genetic programming, women find it necessary to look in a mirror often through out the day and to use the makeup items, as appropriate. It is also believed, that women are likely to check their makeup at least before meeting other people to make sure they look fresh and presentable.

Almost all these women carry cell phones and now increasingly smart phones. These cell phones have larger screens to display web-content as these phones enable web access. Also the form factor of these phones is slim, with close to ¼ inch thickness and close to 3 by 4 inches in size making them convenient to carry on person and in a purse.

There are generally three different types of form factors in smart phones. These are of the slide type, flip open type or no-slide-flip with just a flat touch screen like the Iphone®. Almost all of these smart phones have a touch screen. There is a high degree of competition among the worldwide manufacturers to compete in price, performance, features, and convenience. Recently a new form factor in the form of a tablet like the Ipad® has been introduced in the market place and has become popular.

These cell phones or smart phones have been used and are being used for purposes other than communication. They are used to download and review digital content from the web, play music, play games, play musical instruments, and used as an educational tool. They all have a high quality camera to be able to take pictures. These phones also come with large storage memories and fast processors to support a large number of applications and data. Some newer models with newer 4 G networks also support download and viewing of TV programming.

The newer models that have been introduced within the last year, such as the Iphone® 4 model has two cameras, one in the back of the phone as in prior models and the other one in the front that may be called a user-facing camera. This new user-facing camera is intended to be used to capture live images of a user or a caller party's face in a face to face conversation with a called party to show the called party, the user face and vice versa. The called party also would have a smart phone with a user-facing camera so that each party can see live each other's face and their close surroundings in real-time, to have a more lively and personal communication. Such a lively communication may also include sharing the surroundings where the back facing camera may be used to show what the caller is seeing in the caller's surroundings.

As described in the embodiments herein, this user-facing camera may be used for applications other than a face to face conversation. The embodiments herein describe the use of a makeup mirror, where the combination of the display screen and the user-facing camera is combined with a makeup function operating in the device that may be used to simulate an electronic makeup or grooming mirror. Such an electronic makeup mirror would be used for makeup and would also provide enhanced mirror features not available from a glass mirror.

These enhanced electronic mirror features may include, digitally focusing the images on a part of the face, controlling the light and shading on the face to simulate a light source, providing a tilt angle for the images for better viewing, and creating a makeup gallery to view and compare the effect of different cosmetic items, such as lipstick shades. There may be other features that are not ruled out.

While the embodiments described herein are for an electronic mirror, others may also provide a phone case that would accommodate a miniature version of lipstick and other makeup items. Thus a cell phone along with its carrying case would become a smart phone that has a makeup function with related makeup items. It is believed that such an enhancement to the smart phone would appeal to a very large segment of the public including women and teenagers that makeup almost 50% of the population.

Two embodiments are described. In one embodiment, an electronic mirror is created without the communication features of a cell phone but have all personal digital assistant (PDA) type features in the embodiment in a very slim form factor. The other embodiment is providing for an electronic mirror in a smart phone type device.

In the first embodiment, a system for a grooming mirror in a portable electronic device with a user-facing charge coupled device (CCD) camera has a makeup function that when activated activates the user-facing camera on the device. The camera captures live images of a user's face, digitally focuses them and displays these live images of the user face on the screen enabling the device to function as a grooming mirror for the user.

The makeup function operates on the captured live images to crop and digitally focus the images to show close-up images of the user face. Thus, the device functions as a mirror for the face for grooming and applying cosmetics.

The device may be equipped with a user-facing LED light that is activated to light up the face for the camera.

In a second embodiment, these features of the device are embedded in a portable wireless communication device, also known as smart phones with touch screens. In such embodiments, the device has a feature to put on hold, a face to face communication function, while the user uses the makeup function for grooming and to apply cosmetics.

Thus a user need not carry a makeup mirror as the wireless communication device would serve that function as well. These and other aspects of the embodiments herein are further described in detail with the help of the accompanying drawings and the description, where similar number are used to identify the features of the embodiments.

BRIEF DESCRIPTION OF THE DRAWINGS

Some of the novel features of the embodiments will be best understood from the accompanying drawings, taken in conjunction with the accompanying description, in which similar reference characters refer to similar parts, and in which:

FIG. 5 is a method diagram that illustrates features of a preferred embodiment for use of an electronic grooming mirror.

DESCRIPTION

Figure 1A:
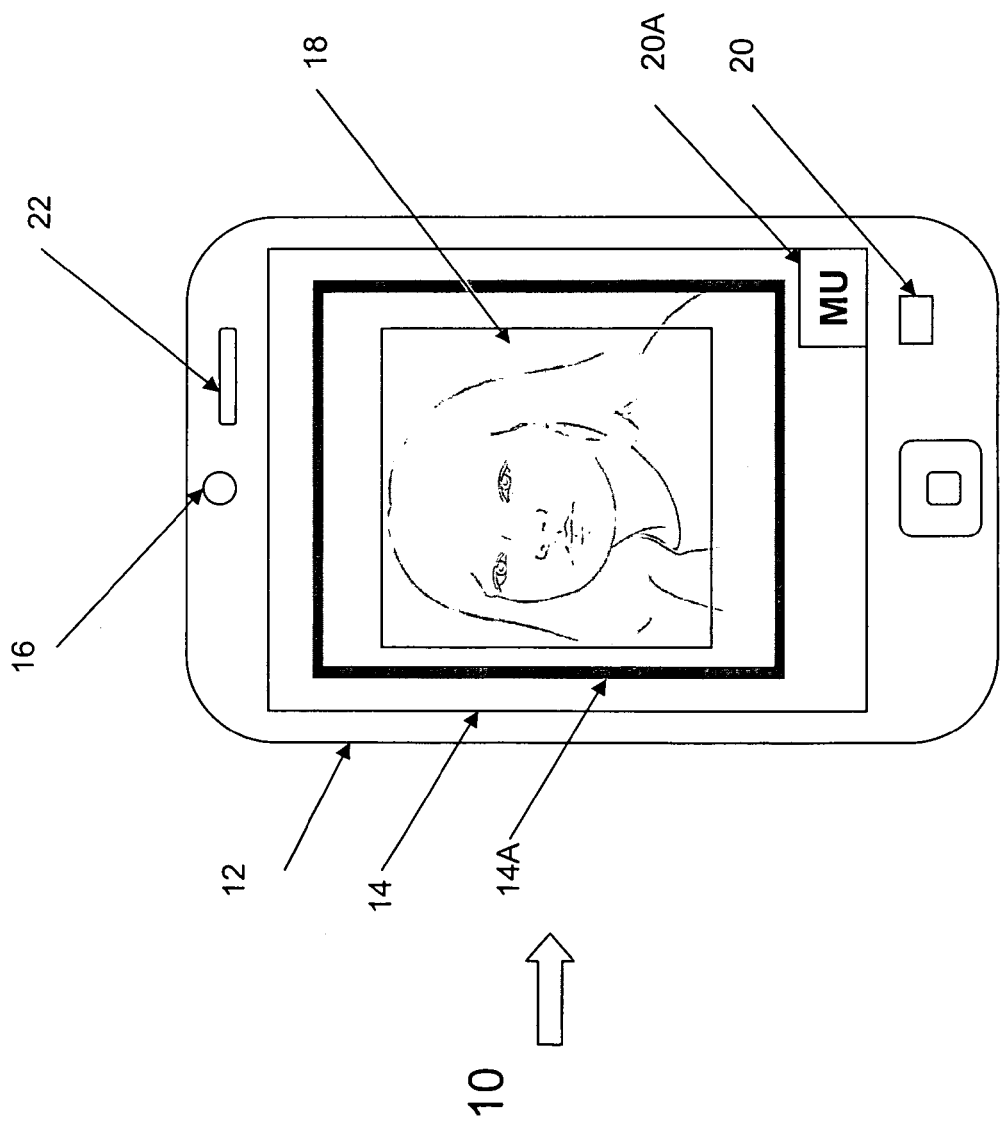
FIGS. 1A, B, and C are block diagrams that illustrate features of the present embodiments of an electronic grooming mirror.
Figure 1B:
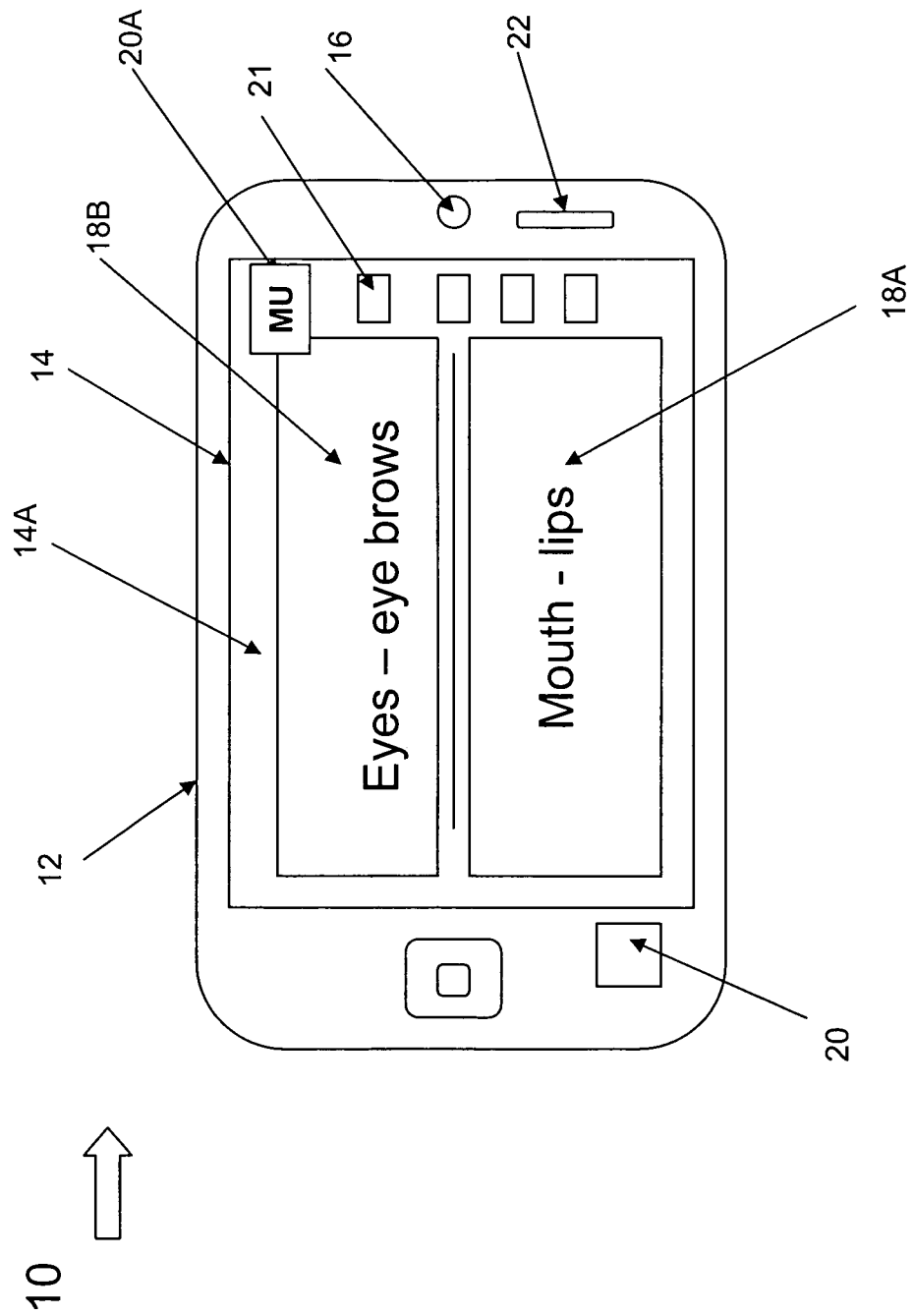
Figure 1C:
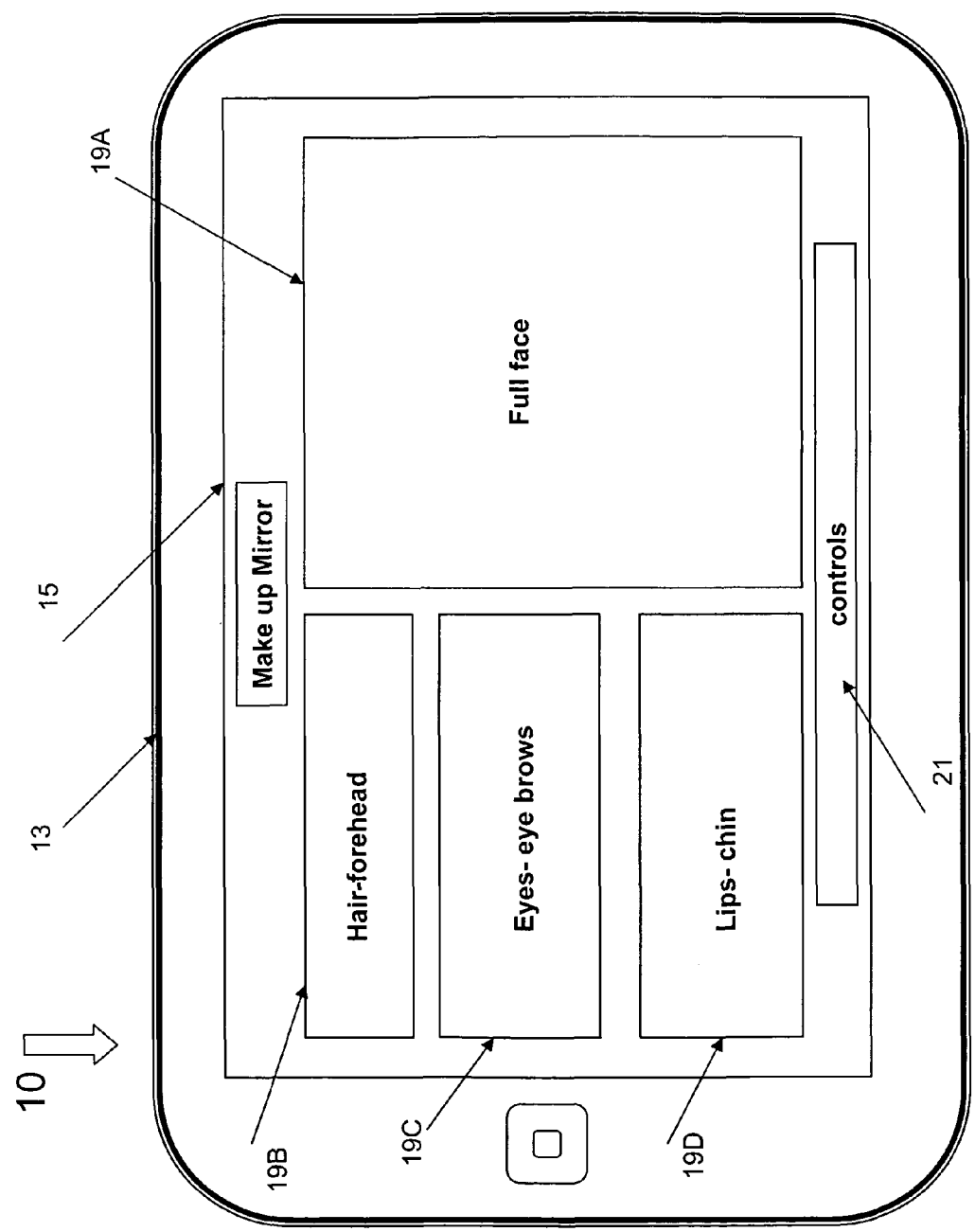

In an embodiment, as illustrated in FIGS. 1A, 1B, and 1C, a system 10 for a grooming mirror or a makeup mirror in a portable electronic device 12 has a display screen 14 with a touch screen overlay 14A for touch control, a storage memory (not shown), a CPU (not shown), a device operating system (not shown), a user-facing charge coupled device (CCD) camera 16, a makeup function logic 20 that is activated by a symbol/icon 20A operative from the memory via the touch screen 14A.

The device 12 optionally may also have a light 22 that would be activated to provide light for the user face. Alternatively the light effect may be simulated by digitally processing the camera images. The device 12 would simulate an electronic makeup mirror to capture live face images and display a full or partial user face image 18 on the display screen 14.

The device 12 would have a slim form factor, perhaps close to ¼ inch in thickness and perhaps 2 by 3 inches in size, where the size of the screen would be around 2 inches and 2½ inches. Such size portable electronic devices are common in prior art based on using current technologies of CCD camera, integrated circuits, and touch screens overlaid over display screens. Such a device called an electronic makeup mirror may be used and carried by women of all ages in their pocket book.

The device 12 has a makeup function 20 in the storage memory that can be activated by a user via symbol/icon 20A, and with the help of the user-facing camera 16, capture live facial images 18 and display them live on the screen 14, thus the screen 14 becomes an electronic mirror. An electronic mirror may provide enhanced mirror functions that may include digital focus on a part of the face such as eyes and lips and cheeks to be able to see these parts of the face to apply makeup items to the face.

As a simplified illustration, FIG. 1B shows the close up images of eyes 18B and lips 18A in a landscape orientation on the screen 14 of the device 12. As another simplified illustration, FIG. 1C shows the electronic makeup mirror in a tablet size device 13 that provides a larger screen size 15 relative to smart phones device 12. Such a screen size 15 may be able to show simultaneously a full face image 19A as well as close up images of hair-forehead 19B, eyes-brows 19C and lips and chin 19D.

As shown in FIG. 1C, further a comprehensive set of the controls 21 to manipulate these images may be positioned on the bottom of the screen 15. The device 13 may also be used in a portrait orientation with a similar arrangement of the images of the face. Such a size device as 13 may also be suitable to show stored and live images side by side to show comparison of these images.

These enhanced electronic mirror features may include, digitally focusing the images on a part of the face, controlling the light and shading on the face to simulate a light source, providing a tilt angle to the images for better viewing, and creating a makeup gallery to view and compare the effect of different cosmetic items, such as lipstick shades. These images are live and show the effect of the face moving and or applying cosmetics. Further each live image may be customized to simulate different ambient light conditions and sources of light. There may be other features that are not ruled out.

As illustrated in FIG. 1B, the screen 14 and the makeup function 20 may be used to show close-up images of the eyes and the lips to better coordinate and view the applying of makeup on these parts of the face.

As illustrated in FIG. 1C, a tablet computer may also be used with large screens relative to smart phones. Such large screen devices may be used similarly as the smart phone devices as in FIGS. 1A and 1B and additionally have the larger screen size to simultaneously show full face and partial face live images. Further these larger size devices may have a pair of user-facing cameras that would support 3-D live images of the face and face parts for the purpose of makeup and applying cosmetics.

Figure 2:
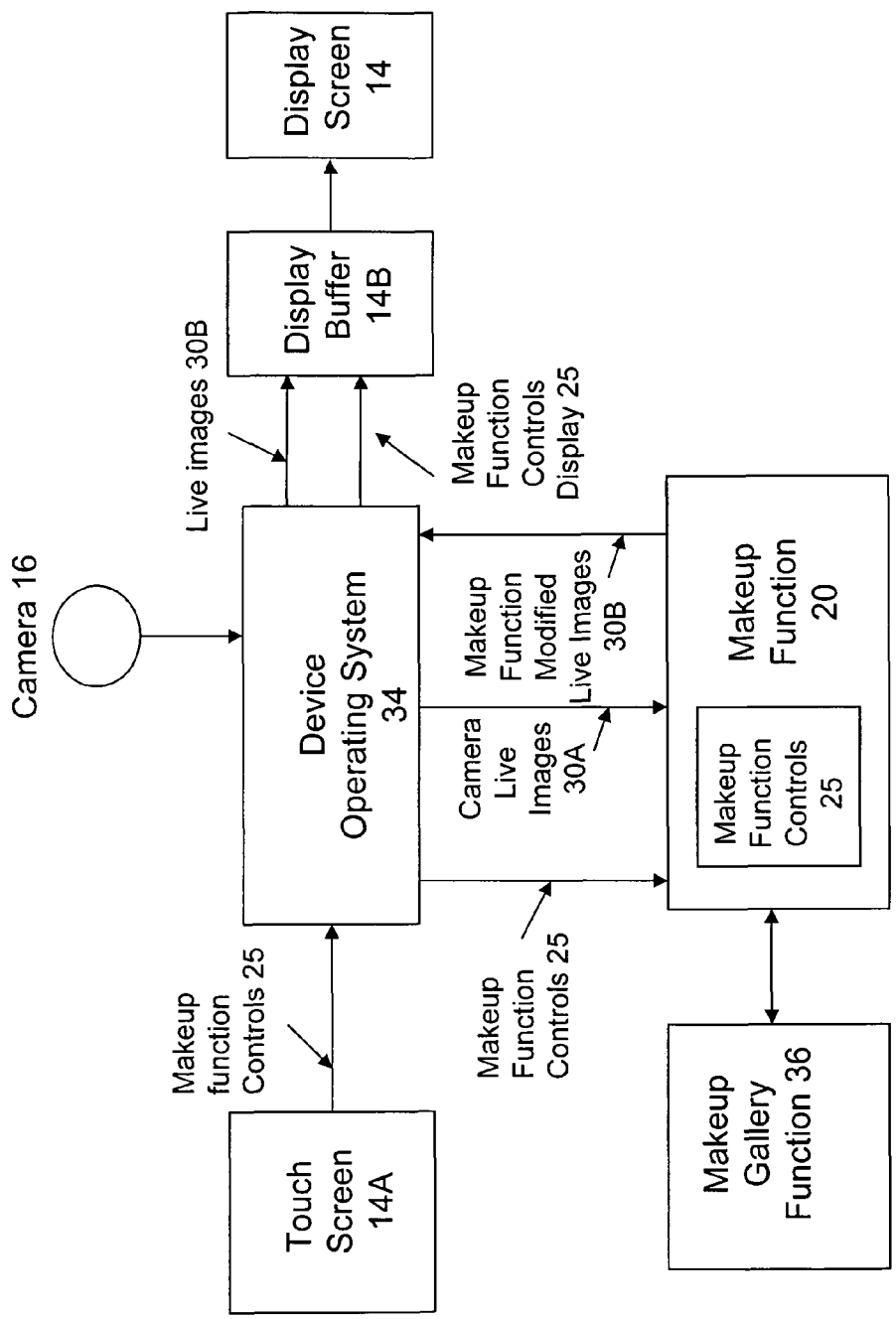
FIG. 2 is a block diagram that illustrates operational features of a preferred embodiment of an electronic grooming mirror.

FIG. 2 shows a simplified illustration of the Device 12 and its operation. The makeup function 20 receives makeup control 25 inputs from the touch screen 14A and receives live images 30A from the camera 16. The makeup function 20 using the controls 25 and the live images 30A, outputs modified live images 30B to the OS 34 for display on the display screen 14 via the display buffer 14B. The Device Operating System (OS) 34 manages the interfaces to the touch screen 14A, the display screen buffer 14B, the camera 16, and the makeup function 20.

The OS 34 receives makeup functions controls 25 from the touch screen 14A and forwards these controls to the makeup function 20 for storage. The OS 34 also forwards live camera images 30A to the makeup function 20. The makeup function 20 operates on these live camera images 30A based on the controls 25 and outputs modified live images 30B to the OS 34 for the OS to send these modified live sequence of images 30B to the display buffer 14B. From the display buffer 14B, these live modified images are then seen on the display screen 14 by the user.

An instance of control settings 25 which were used in modifying the live images 30B are also sent to the OS 34 for them to be over laid on the display screen 14 via the display buffer 14B.

The user control settings 25 are stored in the makeup function 20. They are stored permanently until changed by the user. They may be changed during a makeup mirror session and these changed settings are displayed to the user on the display screen 14 for that session and that instance in the session.

CCD Camera 16

A Charge Coupled Device (CCD) camera is prior art and is defined and identified by the number of pixels. For example a CCD that has one million pixels has 1000 by 1000 array of pixels in a small area such as ¼ by ¼. The CCD has light sensing elements of three primary colors that produce charge that is proportional to the intensity of that color and converts the light intensity and color into a matrix of numbers that are equivalent to the colors and their intensity.

As a simplified illustration, the light and color intensity for each pixel may be stored as three bytes, for each pixel and its color. Thus a raw image size in bytes from a 0.3 million pixel CCD would require 0.9 Mega byte of memory. However, the image may be compressed using compression algorithms, as in common in prior art and may require a much less storage space of a few hundred Kilo bytes.

That is, a CCD produced image is a matrix of numbers that represent different colors and the intensity of these colors. These images can be manipulated by software functions that add offset to these base image numbers to create changes or effects in the image. For example, to lighten up the entire image a delta number may be added to all the numbers. There are various prior art image processing functions that provide, light control, color control and balance, image cropping, and image rotation, image controls, and image enhancement etc.

Further to create a full live effect, the CCD images are captured at the rate of 24 to a second. The time between two frames of a live camera images would be ½₄ second or equal to close to 40 millisecond. Such a time is more than adequate to perform image enhancements between each frame, as the processor and memory operate at speeds that would operate the image enhancement function in much less of a time.

These technologies of CCD and image manipulation are prior art and no specific claim is made to these technologies except to the degree they are used in the makeup function 20 for the specific application of different features of simulating an electronic mirror for makeup.

Makeup Gallery Function 36

Figure 3:
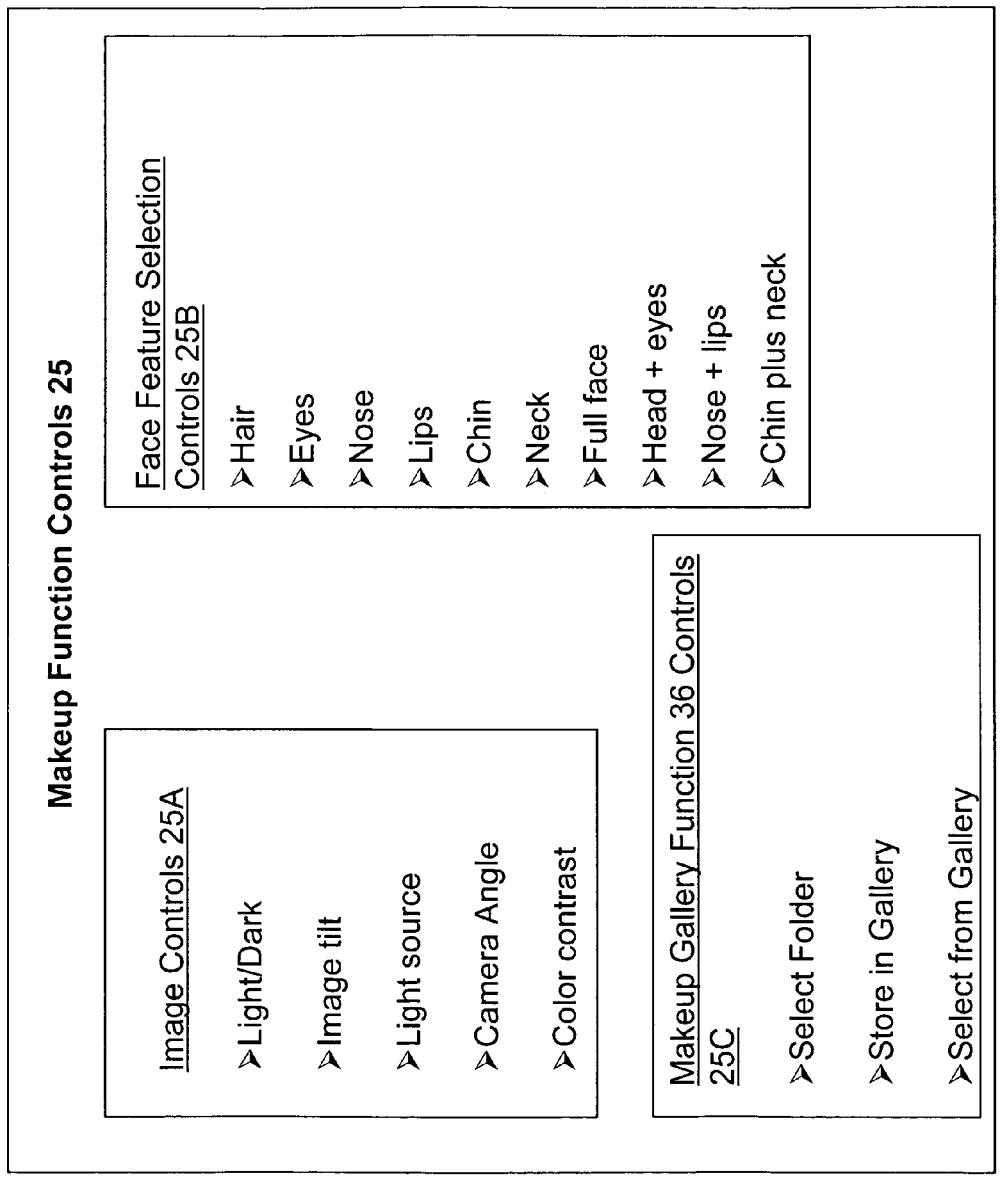
FIG. 3 is a block diagram that illustrates features of a preferred embodiment of an electronic grooming mirror user controls.

As illustrated in FIGS. 2 and 3, an optional makeup gallery function 36 may also be provided with the help of makeup gallery storage (not shown) and corresponding control commands 25C for the makeup gallery. The makeup gallery function 36 stores still images of the facial makeup and brings them up for selection and display. These makeup images may be stored in the makeup gallery in multiple folders. Some of these folders may store images that have been provided by various cosmetic manufacturers and may be down loaded from the websites of these manufacturers. These images may illustrate different makeup features and styles as well as the features of the cosmetic products.

The makeup gallery function 36 enables selection, and viewing of these images. The makeup gallery function 36 also enables snapping still images of the user face from the screen as seen by the user for storage in the makeup gallery. These snapped images may also be selected and viewed on the screen and these two types of images may be compared by placing them side by side on the screen 14.

The software technology that supports makeup gallery functions as described above is prior art and no specific claim is made for the technology except for how it is used in the makeup gallery function 36 in a portable device 12.

User Controls 25

FIG. 3 shows a simplified illustration of various Makeup function controls 25. There are three types of controls. Controls 25A facilitate control of the image, such as light/dark, image tilt, light source, camera angle, and color contrast. Controls 25B help select a part of the face image, such as hair, eyes, nose, lips, chin, full face, head plus eyes, nose plus lips and chin plus neck. Controls 25C help store and select images from the makeup gallery, such as, select a folder, select from gallery and store in the gallery.

There may be other controls that are not ruled, such as application setting controls as part of the programming of the makeup function that may not be directly accessible to a user but would be accessible to a person setting up the application on the device for a user.

Makeup Function 20

The makeup function 20 is software and/or a firmware function that is stored in the permanent memory of the device 12 and device 13 and has user settable parameters to customize for individual needs.

The function 20, when activated, activates the user-facing camera 16 on the device. The camera 16 captures live images of a user's face 18 and the logic enhances the face images and displays live images of the user face 18 on the screen 14, wherein, the device 12 functions as a grooming mirror for the user.

Figure 4:
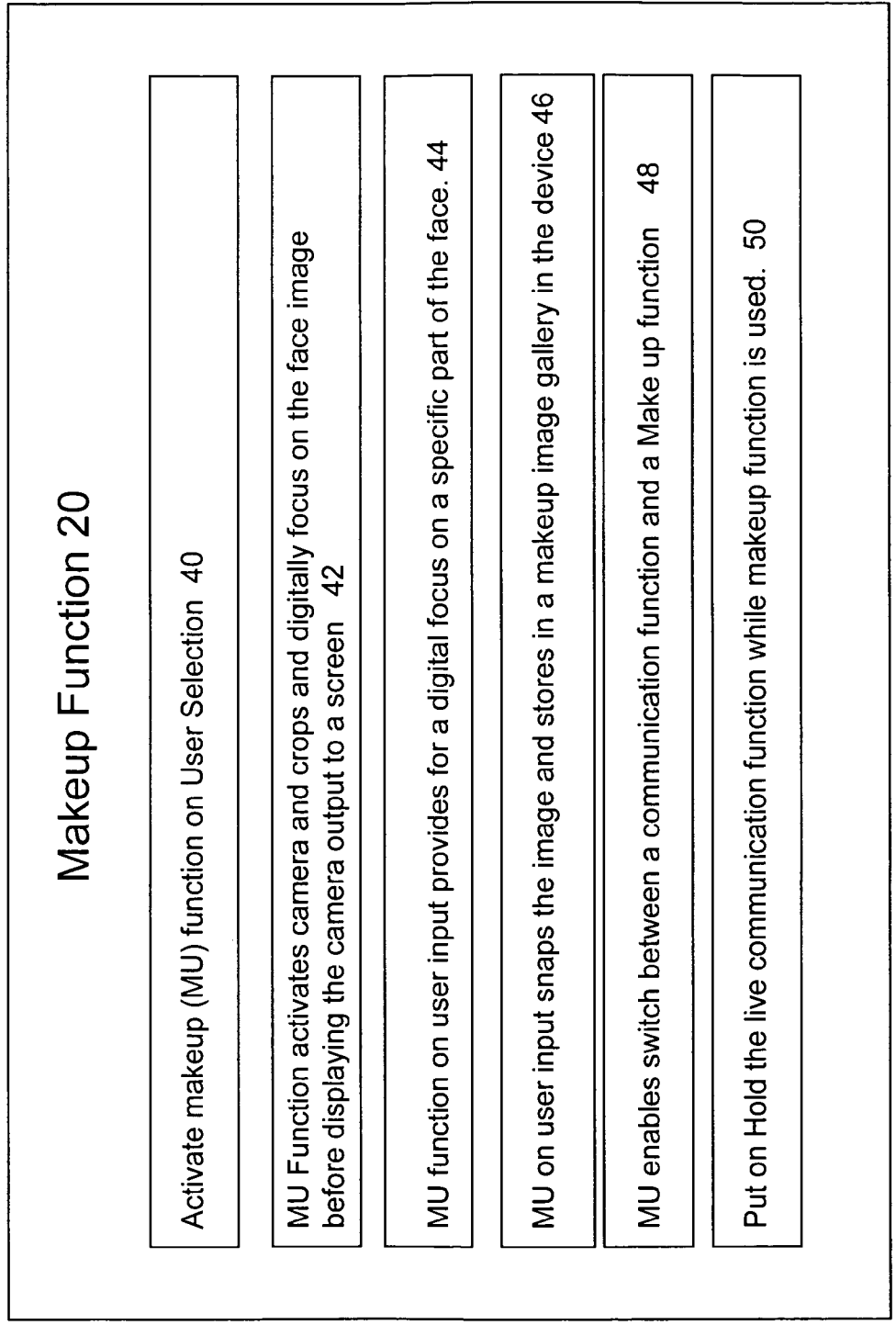
FIG. 4 is a block diagram that illustrates features of a preferred embodiment of an electronic grooming mirror functions.

As illustrated in FIG. 4, the makeup function 20 has sub-functions of (i) activate MU function 40, (ii) activate camera to collect live images 42, (iii) crop and digitally focus the face images based on selected user parameters 44, (iv) snap images to store in a makeup gallery and review these images 46, (v) switch between a makeup function and a communication function 48, and (vi) put on hold the live communication function while makeup function is used to freshen up 50.

The function 44 to crop and digitally focus the face image is based on parameters that are selected by the user and requires the user to define how they would use a makeup function. All users are likely to be different in how their head including the face and hair looks like and how they hold the device 12 to use the makeup function.

As a simplified illustration, if a user holds the device at a distance of 10 inches from the face, the image size as seen by the camera includes areas around the face and the head. A full head shot may be defined by a window of the image in pixels. Then the image that appears on the screen is automatically cropped to this window. Each of the facial features may similarly be defined by a window in pixels and when that facial feature is selected, the window is cropped to that size and then enlarged to fill up the screen. Other techniques of image cropping and enhancement may be used and are not ruled out.

MU function operates on the captured images to crop and digitally focus the images to show close up images of the user face. Thus, the device functions as a mirror for the face for grooming and applying cosmetics. The device optionally may be equipped with a user-facing light 22 that is activated to light up the face for the camera.

The technology of manipulating digital images in any number of ways, such as reduce and enlarge image size, crop the images, filter to remove light biases and digitally enhance and digital focus digital images is prior art. Such prior art technology is used to monitor the live images and alter them based on user set parameters to show these live images on the screen.

The parameters may include identifying a size of the full face to include a full face, so that only a face is shown even if the captured images capture more than the face images.

Another parameter may be to adjust the angle of the image relative to the viewer so that no matter at what angle the live images are captured, the user sees a preset angle live image to be able to better relate with the image while applying cosmetics. A third parameter may include defining different parts of the face to show close up images of these parts via a digital focus.

Cameras capture live images at the rate of 24 images in one second. The processors and random access memory that are used in the modern electronic handheld devices are fast enough to be able to operate on the live images at this rate to change each image based on user selected parameters as discussed above. Any number of image processing prior art technologies used in image manipulation, image storage, compression, and streaming of video images may be utilized.

The makeup function provides user controls on the device that display digitally focused close up images from one of the images of, (i) an entire face, (ii) hair and forehead, (iii) eyes, (iv) cheeks and nose, (v) lips and chin, and (vi) throat area on the screen, wherein a close up viewing of these parts of the facial images is displayed on the screen for the purpose of grooming and applying cosmetics.

The makeup function may also have a feature to create a makeup gallery that stores static pictures of facial makeups and displays them individually and side by side on the screen for comparison.

The device is of the size of a handheld smart phone with a touch screen. Alternatively, the device may also be of the size of a tablet computer with a touch screen.

The device has a touch screen and uses touch screen controls to adjust the live face image on the screen. The makeup function enables light and darkness control of the face images on the screen.

In an embodiment the device is equipped with a wireless communication function and a feature to switch between the makeup function and the communication function, wherein a user may apply makeup while waiting for a communication function to begin. Further a feature to put on hold a face to face communication function, while the user uses the makeup function to apply cosmetics before resuming the face to face communication function may also be provided.

In a face to face communication with a potential customer or a friend to learn their opinion, the feature may be used for getting an optional feedback from a face to face communication party to see and review the cosmetic features as part of a demonstration to make a sale of the cosmetic item.

In this embodiment, a mobile portable wireless communication device has a display screen, a storage memory, a CPU, a user-facing CCD camera, a communication function, and makeup function logic. The makeup function when activated activates the user-facing camera on the device, the camera looks at a user's face and displays live images of the user face on the screen, thereby, the device functions as a grooming mirror for the user.

The makeup function in the device before displaying the image, operates on the image to crop and adjust the image in size to fill the screen that show a close up image of the user face, enabling the device to function as a makeup mirror for the purpose of seeing the face and grooming and applying cosmetics.

The makeup function provides user controls on the device that enable one of the close up images of, an entire face, hair, forehead, eyes, cheeks, nose, lips, chin and throat or a combination of any of them to be displayed on the screen, thereby a close up viewing of these parts of the facial image is displayed on the screen for the purpose of grooming and applying cosmetics to these parts of the face.

The device may provide a feature to switch between the makeup function and the communication function, enabling a user to apply makeup while waiting for a communication function to begin or load on the device.

The device may also provide a feature to put on hold a face to face communication function, while the user uses the makeup function for grooming and to apply cosmetics. The device may also have a user-facing light and a feature to activate the user-facing light when the makeup function is activated.

Mode of Operation

As a simplified illustration of the mode of operation of the embodiments herein, a user would choose to load a makeup app on the device or it may come preloaded. The makeup application would be shown as a MU icon on the touch screen. The user would touch the icon and the screen would show a full face image of the person on the screen, where the image has been cropped and enlarged to show a full face.

There would be a light/darkness control on the side of the image enabling the user to control the best lighting for the image. After the user as seen the full face image video, the user may touch the lip area and the image would change to show only the lip area of the face. The user may check the condition of the lipstick and apply lipstick and see how it appears on her face. The user may switch back and forth between the lip image or any other partial image and the full face image. The user may click the head to see the hair and the eyes to see the mascara condition.

The user may tap both the eyes and the lips in quick succession and would see a split screen with a close-up of eyes on the top of the screen and the lips on the bottom of the screen. The user may use image tilt controls to show these images at an angle that would better display the features. Further, user select a zoom-up function within each of the face images to show a further close up to better examine the condition of the skin and the effect of the makeup on that part of the skin.

The user may activate the makeup gallery and review images from the gallery and select an image and show that image next to her live face image to compare the two images, one from the gallery and other being the live image being captured by the camera and enhanced by the makeup function.

The user may snap an image of her face or features with or without makeup and store them in the makeup gallery for later viewing and sharing with friends and sellers of cosmetics.

Further, when a user is using the device 12 for a communication function either with a face to face chat or audio connection only, the user may use the makeup function 20 and other functions interchangeably. That is the user can review and apply makeup while carrying out an audio conversation and review and apply makeup while putting the face to face part of the chat on hold.

The makeup gallery has folders that show face images with different makeup items from different cosmetic vendors. The user may select and view these images and decide to purchase them using online commerce functions that may also be provided in the device 12. Such online commerce features would be prior art.

Method of Operation

As illustrated in FIG. 5, a method for a grooming mirror in a portable electronic device has the following steps where all the steps may not be used or used in the order specified:

At step 100, operating makeup function logic in a portable electronic device that has a display screen, a storage memory, a CPU, and a user-facing camera;

At step 102, activating the makeup function activates the user-facing camera on the device that is looking at a user's face and displaying the face image on the screen, thereby, the device functions as a makeup mirror for the purpose of seeing the face on the screen.

At step 104, operating on the images, by the makeup function, to crop and adjust the images in size to fill the screen that show a close up image of the user face, enabling the device to function as a makeup mirror for the purpose of seeing the face and applying cosmetics on the face.

At step 106, providing user controls on the device by the makeup function that enable one of the close up images of, an entire face, forehead, eyes, cheeks, nose and lips and chins or a combination of any of them to be displayed on the screen, thereby a close up viewing of these parts of the facial image is displayed on the screen for the purpose of applying cosmetics to these parts of the face.

In summary, the preferred embodiments are on an electronic mirror in a portable electronic device with a user-facing CCD camera and has a makeup function that when activated activates the user-facing camera on the device, the camera captures images of a user's face and displays live images of the user face on the screen, wherein, the device functions as a grooming mirror for the user.

The makeup function operates on the captured images to crop and digitally focus the images to show close up images of the user face, thus the device functions as a mirror for the face for grooming and applying cosmetics. The device has a feature to put on hold a face to face communication function, while the user uses the makeup function for grooming and to apply cosmetics. The device is equipped with a user-facing light that is activated to light up the face for the camera.

While the particular invention, as illustrated herein and disclosed in detail is fully capable of obtaining the objective and providing the advantages herein before stated, it is to be understood that it is merely illustrative of the presently preferred embodiments of the invention and that no limitations are intended to the details of construction or design herein shown other than as described in the appended claims.

The invention claimed is:

1. A system for a grooming mirror in a portable electronic device, comprising:
   a. a portable electronic device has a display screen, a storage memory, a CPU, a user-facing charge coupled device (CCD) camera, and a makeup function logic operative from the memory;
   b. the makeup function when activated activates the user-facing camera on the device, the camera captures live images of a user's face and the logic enhances the images of the user face and displays live images of the user face on the screen, wherein, the device functions as a grooming mirror for the user
   c. the makeup function further comprising: a feature to create a makeup gallery that stores static pictures of facial makeups and displays them individually and side by side on the screen for comparison.

2. The system as in claim 1, further comprising:
the makeup function operates on the captured images to crop and digitally focus the images to show close up images of the user face, thus the device functions as a mirror for the face for grooming and applying cosmetics.

3. The system as in claim 2, further comprising:
the makeup function provides user controls on the device that display digitally focused close up images from one of the images of, (i) an entire face, (ii) hair and forehead, (iii) eyes, (iv) cheeks and nose, (v) lips and chin, and (vi) throat area on the screen, wherein a close up viewing of these parts of the facial images is displayed on the screen for the purpose of grooming and applying cosmetics.

4. The system as in claim 1, further comprising:
the device equipped with a user-facing light that is activated to light up the face for the camera.

5. The system as in claim 1, further comprising:
the device is of the size of a handheld smart phone with a touch screen, alternatively, the device is of the size of a tablet computer with a touch screen.

6. The system as in claim 1, further comprising:
the device has a touch screen and uses touch screen controls to adjust the face image on the screen.

7. The system as in claim 1, further comprising:
the makeup function enables light and darkness control of the face image on the screen.

8. The system as in claim 1, further comprising:
   a. the device equipped with a wireless communication function;
   b. a feature to switch between the makeup function and the communication function, wherein a user may apply makeup while waiting for a communication function to begin.

9. The system as in claim 8, further comprising:
a feature to put on hold a face to face communication function, the user uses the makeup function to apply cosmetics before resuming the face to face communication function.

10. The system as in claim 9, further comprising:
getting an optional feedback from a face to face communication party to see and review the cosmetic features as part of a demonstration to make a sale of the cosmetic item.

11. A mobile portable wireless communication device, comprising:
   a. the portable electronic device has a display screen, a storage memory, a CPU, a user-facing CCD camera, a communication function, and a makeup function logic;
   b. the makeup function when activated activates the user-facing camera on the device, the camera looks at a user's face and displays a continuing series of images of the user face on the screen, thereby, the device functions as a grooming mirror for the user
   c. the makeup function further comprising: a feature to create a makeup gallery that stores static pictures of facial makeups and displays them individually and side by side on the screen for comparison.

12. The device as in claim 11, further comprising:
the makeup function before displaying the image, operates on the image to crop and adjust the image in size to fill the screen that show a close up image of the user face, enabling the device to function as a makeup mirror for the purpose of seeing the face and grooming and applying cosmetics.

13. The device as in claim 11, further comprising:
the makeup function provides user controls on the device that enable one of the close up images of, an entire face, hair, forehead, eyes, cheeks, nose, lips, chin and throat or a combination of any of them to be displayed on the screen, thereby a close up viewing of these parts of the facial image is displayed on the screen for the purpose of grooming and applying cosmetics to these parts of the face.

14. The device, as in claim 11, comprising:
a feature to switch between the makeup function and the communication function, enabling a user to apply makeup while waiting for a communication function to begin or load on the device.

15. The device, as in claim 11, comprising:
a feature to put on hold a face to face communication function, while the user uses the makeup function for grooming and to apply cosmetics.

16. The device, as in claim 11, comprising:

the device has a user-facing light and a feature to activate the user-facing light when the makeup function is activated.

17. A method for a grooming mirror in a portable electronic device, comprising the steps of:
- a. operating a makeup function logic in a portable electronic device that has a display screen, a storage memory, a CPU, and a user-facing camera;
- b. activating the makeup function activates the user-facing camera on the device that is looking at a user's face and displaying the face image on the screen, thereby, the device functions as a makeup mirror for the purpose of seeing the face on the screen;
- c. the makeup function further comprising: a feature to create a makeup gallery that stores static pictures of facial makeups and displays them individually and side by side on the screen for comparison.

18. The method as in claim 17, further comprising the steps of:

operating on the images, by the makeup function, to crop and adjust the images in size to fill the screen that show a close up image of the user face, enabling the device to function as a makeup mirror for the purpose of seeing the face and applying cosmetics on the face.

19. The method as in claim 17, further comprising:

providing user controls on the device by the makeup function that enable one of the close up images of, an entire face, forehead, eyes, cheeks, nose and lips and chins or a combination of any of them to be displayed on the screen, thereby a close up viewing of these parts of the facial image is displayed on the screen for the purpose of applying cosmetics to these parts of the face.

* * * * *